(12) United States Patent
Horvitz

(10) Patent No.: US 7,658,814 B2
(45) Date of Patent: Feb. 9, 2010

(54) IRRIGATION PIPE SPLICE SLEEVE AND METHOD

(75) Inventor: Amir Horvitz, Negev (IL)

(73) Assignee: Netafim, Ltd., Tel Aviv (IL)

( * ) Notice: Subject to any disclaimer, the term of this patent is extended or adjusted under 35 U.S.C. 154(b) by 457 days.

(21) Appl. No.: 11/626,124

(22) Filed: Jan. 23, 2007

(65) Prior Publication Data

US 2008/0174109 A1    Jul. 24, 2008

(51) Int. Cl.
*B29C 65/02*    (2006.01)
(52) U.S. Cl. .................. 156/304.3; 156/294; 156/304.2

(58) Field of Classification Search ................ 285/21.1, 285/21.2, 21.3, 288.1, 15; 156/294, 158, 156/304.3, 304.2, 304.1; 264/274
See application file for complete search history.

(56) References Cited

U.S. PATENT DOCUMENTS

| 4,718,698 A | 1/1988 | Hill |
| 6,090,233 A | 7/2000 | Delmer |

*Primary Examiner*—David E Bochna
(74) *Attorney, Agent, or Firm*—Womble Carlyle

(57) ABSTRACT

An irrigation pipe splice is formed from two sub-assemblies, each sub-assembly including a sleeve mated to a pipe section. Each sleeve has an inner wall and an outer wall connected by a rim, the outer wall surrounding at least a portion of the inner wall and forming a gap therewith. In the pipe splice, the inner and outer walls sandwich a pipe wall within the gap.

7 Claims, 7 Drawing Sheets

IRRIGATION PIPE SPLICE SLEEVE AND METHOD

BACKGROUND

The present disclosure relates to a pipe splice and to a sleeve and a method of using the sleeve to splice two pipe sections together.

Pipes, such as irrigation pipes, may be cut into pipe sections when setting up an irrigation system in a field. These sections may be spliced together at the end of their use in the field to form a continuous pipe that may be reused.

U.S. Pat. No. 6,090,233, the disclosure of which is incorporated herein by reference, describes a method of joining two hose segments by placing a first inner segment within a second outer segment to create an overlapping area and then applying heat and compressive force upon the overlapping area to fuse the two segments together. A flat heat shield which is positioned within the overlapping area prevents the inner circumferential surface on the inner segment from adhering to itself during heat fusion.

During use, pipes normally accumulate dirt and sediment on their outer and inner surfaces. These surfaces should be cleaned in the vicinity of the overlapping area for the two segments to bond successfully.

U.S. Pat. No. 4,718,698, the disclosure of which is incorporated herein by reference, describes an apparatus for forming a butt joint between two pipe sections which comprises a pair of sleeves made of material which melts and fuses at the same temperature as the pipe sections. To make the butt joint, each sleeve is first inserted into an end of a pipe section and then the two pipe sections are axially aligned to bring their sleeves into abutting engagement with each other. Applying heat upon the vicinity of the sleeves causes the abutting faces of the sleeves to become fused together, and each sleeve to be fused to its respective pipe section.

If the sleeve and pipe have slightly different melting temperatures, the sleeve might not fully fuse with the pipe resulting in a weaker but joint. This may be overcome if the pipe sections would directly fuse to each other.

SUMMARY

The following embodiment and aspects thereof are described and illustrated in conjunction with systems, tools and methods which are meant to be exemplary and illustrative, not limiting in scope.

In an embodiment an irrigation pipe splice or a butt joint comprises two pipe sections and two sleeves, the pipe sections may be pipes removed from an irrigation field where they were used in an irrigation system and may vary in length from short sections of 1 meter or less to long sections of above 10 meters.

In an embodiment, each pipe section comprises a pipe wall, is associated with one of the sleeves and meets the other pipe section and sleeve at a join.

In an embodiment, each sleeve comprises an inner wall that fits within at least a portion of the pipe wall and an outer wall that fits over at least a portion of the pipe wall.

In an embodiment, a splice width may be defined as including the widths of the inner, outer and pipe walls; and a splice center line dividing the splice width into two halves, passes through the pipe wall at least adjacent the join. The join being an area where one pipe section and sleeve has fuse welded to another pipe section and sleeve. The area adjacent the join includes at least portions of the pipe, inner and outer wall that at least partially melt or deform when fuse welding.

In an embodiment, there is also provided a method of forming an irrigation pipe splice including the step of providing two pipe sections and two sleeves, each sleeve being associated with one of the pipe sections to form a sub-assembly. Each sleeve comprises an inner wall and an outer wall that meet at a rim, the inner wall fits within at least a portion of the associated pipe section and the outer wall that fits over at least a portion of the associated pipe section. The method further comprises forming the two sub-assemblies by inserting each sleeve into a pipe section, axially aligning the two sub-assemblies so that the rims face each other, applying heat upon the rims and axially biasing at least one sub-assembly against the other sub-assembly.

In an embodiment, an irrigation splice width includes the widths of the inner, outer and pipe walls and a splice center line dividing the splice width into two halves, passes through the pipe wall at least adjacent the rim and the heat causes at least a portion of the pipe wall above the splice center line to flow above and away from the splice center line and at least a portion of the pipe wall below the splice center line to flow below and away from the splice center line.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
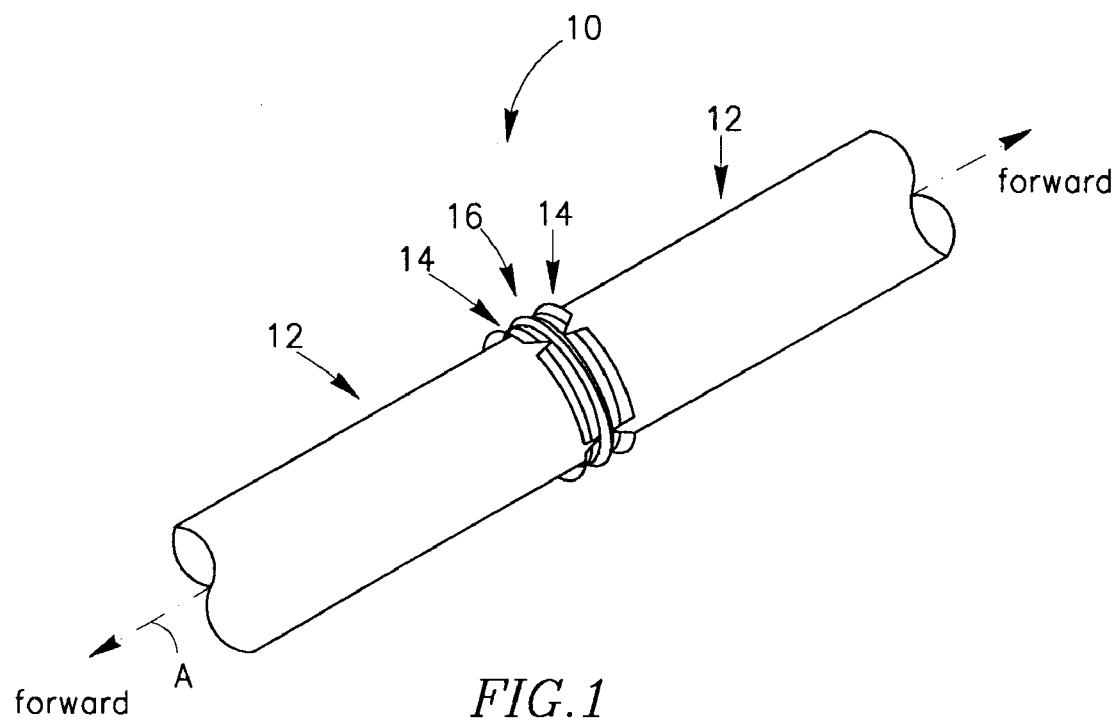
FIG. 1 shows a pipe splice in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
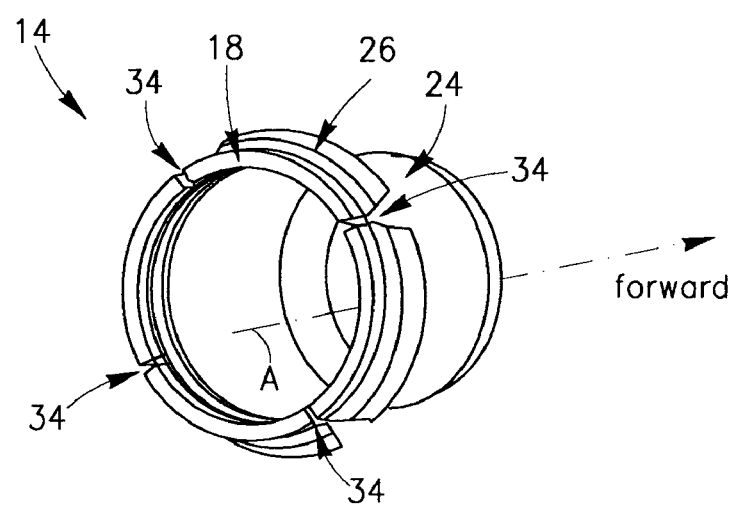
FIG. 2 shows a sleeve in accordance with the present disclosure.

Attention is first drawn to FIGS. 1 and 2 showing a fusion welded irrigation pipe splice 10 having a longitudinal axis A and including two pipe sections 12 and two sleeves 14 that extend all along the axis A. Each pipe section 12 is associated with one of the sleeves 14 and meets the other pipe section and sleeve at a join 16. An axial forward direction of the axis A is defined in a direction away from the join 16.

The pipe sections 12 are optionally formed by extrusion directly as a pipe or by any other production method (including extrusion) that may include the steps of first forming a sheet and then rolling it to form a pipe. The material of the pipe sections 12 may include polyethylene, polypropylene or similar thermoplastic materials. The sleeves 14 may be formed by extrusion, injection molding, blow molding, vacuum forming or any other suitable method from for example polyethylene, polypropylene, polybutene, polyvinylchloride, thermoplastics, elastomers, copolymers or any other material and synthetic resin such as polyester resin.

It is noted that directional terms appearing throughout the specification and claims, e.g. "forward", "rear" etc., (and derivatives thereof) are for illustrative purposes only, and are not intended to limit the scope of the appended claims. In addition, the sleeves 14 and the pipe sections 12, even when shown alone, will be described herein as in their respective orientation in the pipe splice 10 and therefore in relation to the axis A. Finally, for convenience of the description the pipe sections 12 and sleeves 14 are shown herein extending axially along a straight axis A however they may also axially follow a curved or partially curved axis A.

Figure 3:
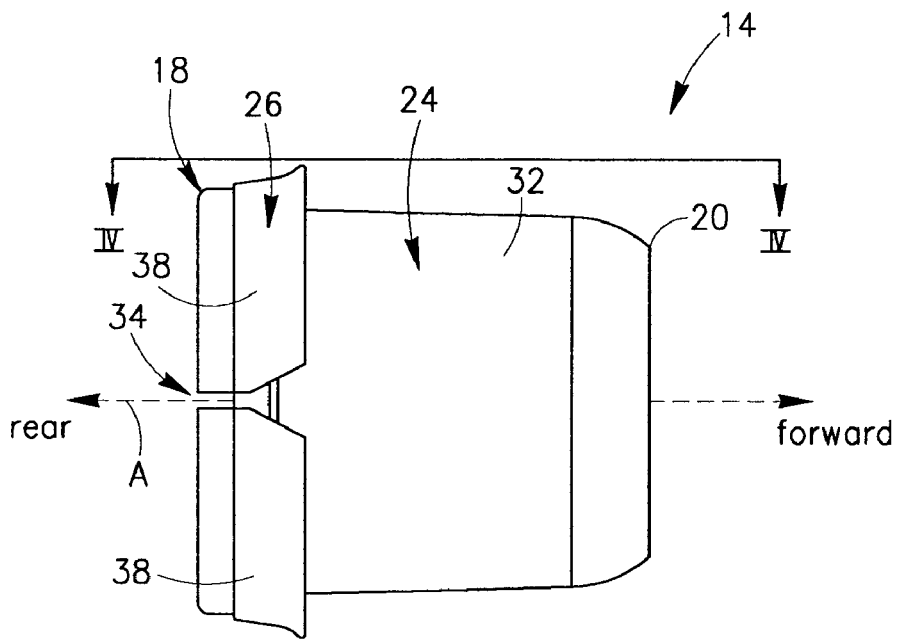
FIG. 3 shows a side view of the sleeve.
Figure 4:
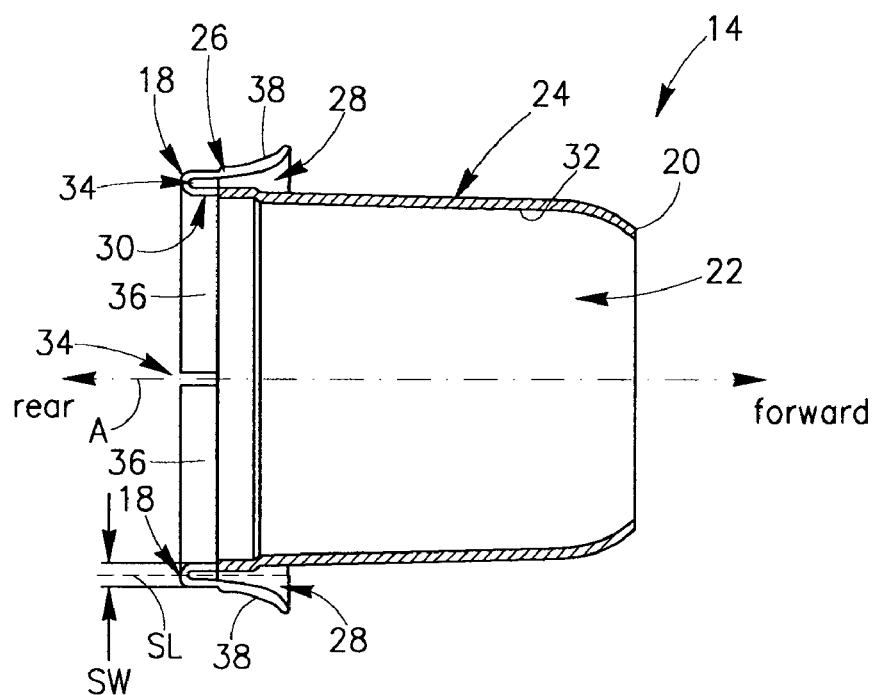
FIG. 4 shows a cross sectional view of the sleeve taken along line IV-IV in FIG. 3.

Attention is now additionally drawn to FIGS. 3 and 4. The sleeve 14 has a rim 18 at a rear end, a lip 20 at a forward end and a cavity 22 that extends axially along the axis A and opens out to the rim 18 and to the lip 20. An inner wall 24 of the sleeve 14 surrounds the cavity 22 and an outer wall 26 of the sleeve 14 extends forwardly from the rim 18, surrounds a rear portion of the inner wall 24 and forms a peripheral gap 28 therewith. The inner wall 24 has a rear neck 30 and a forward collar 32.

Four slits 34, symmetrically distributed about the axis A, are formed in the inner and outer walls 24, 26 of the sleeve 14 and open out to the rim 18. Each pair of adjacent slits 34 define therebetween a bulge 36 and a corresponding finger 38. The bulges 36 are formed in the neck 30 and the fingers 38 are formed in the outer wall 26 and each bulge 36 meets its corresponding finger 38 at the rim 18. The slits 34 contribute to a resilience of each bulge 36 in relation to the collar 32 and each finger 38 in relation to its corresponding bulge 36.

A sleeve width SW measured in the vicinity of the rim 18 in a direction perpendicular to the axis A, includes the widths of a given bulge 36, its associated finger 38 and the gap 28 therebetween. A sleeve center line SL that divides the sleeve width SW into two equal halves passes through the gap 28 in the vicinity of the rim 18. The above mentioned vicinity of the rim 18 includes portions of the inner and outer walls 24, 26 that melt when forming the pipe splice 10 as will be described hereinbelow.

Figure 5:
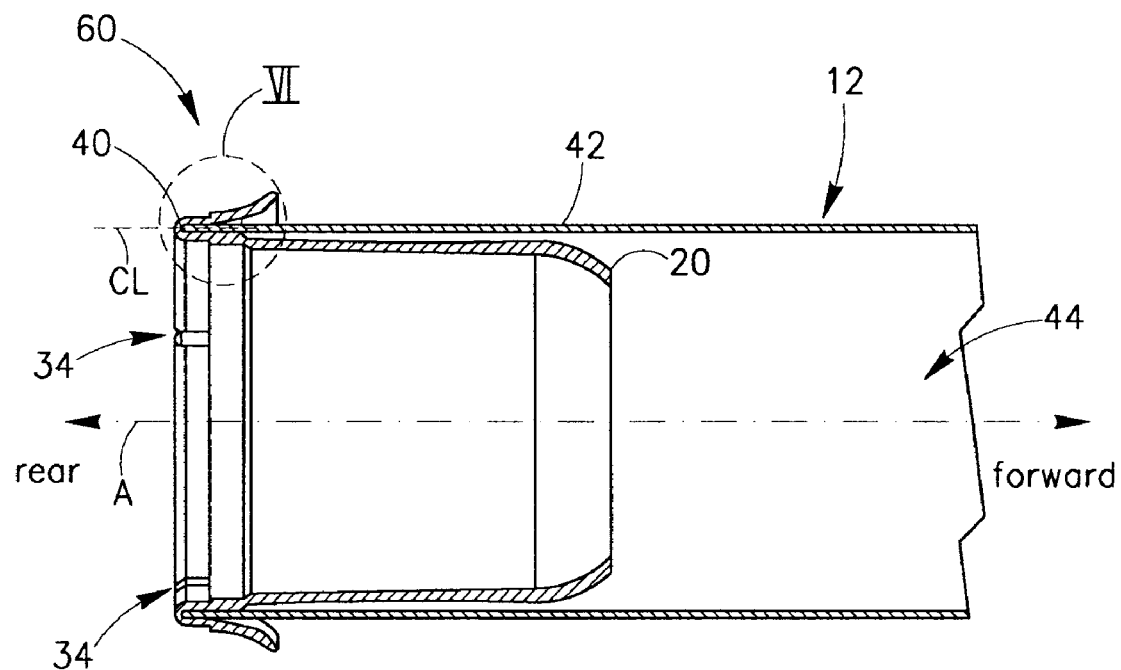
FIG. 5 shows a cross sectional view of a sub-assembly comprising the sleeve mounted in a pipe section.
Figure 6:
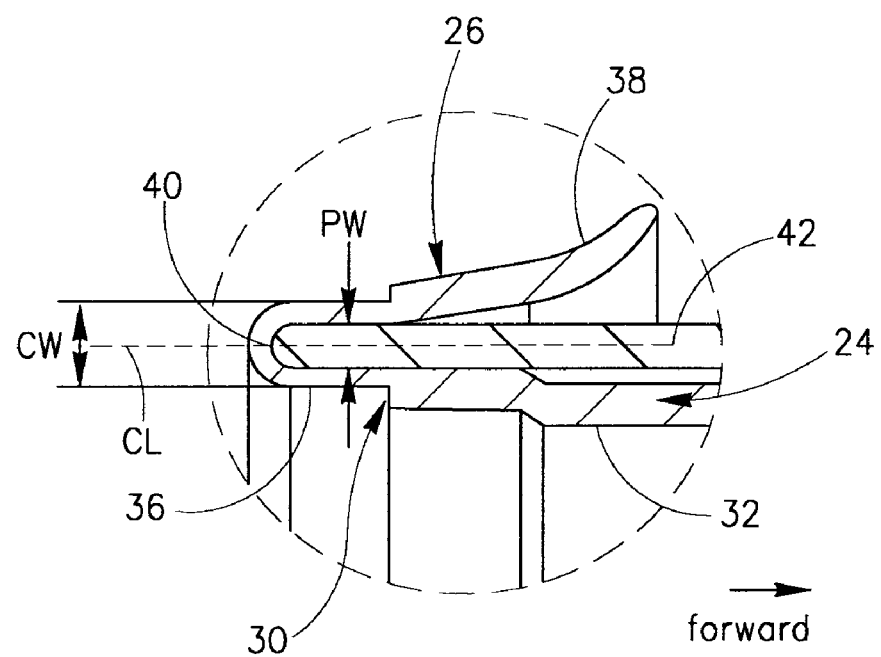
FIG. 6 shows a section of FIG. 5.
Figure 7:
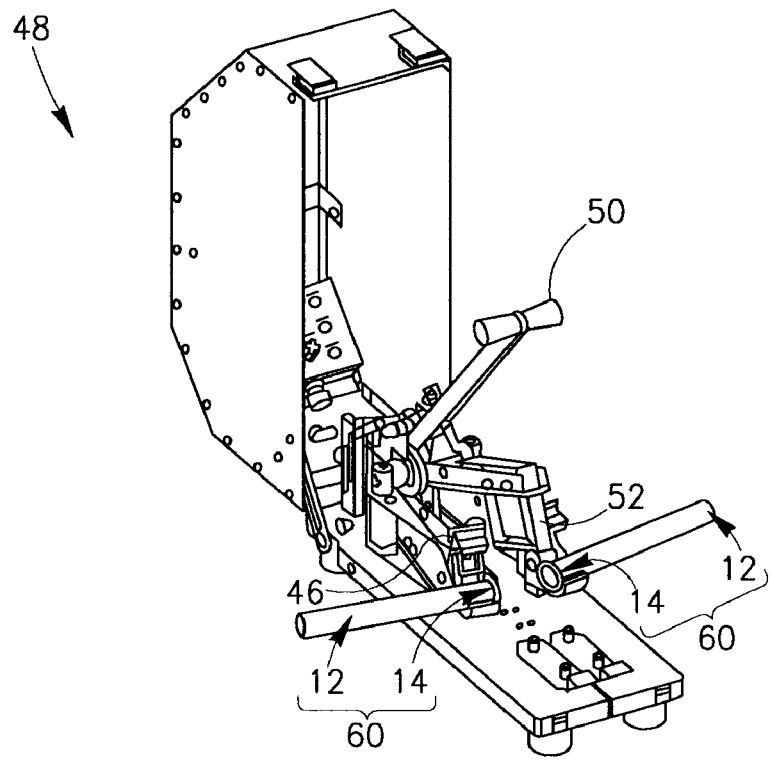
FIG. 7 shows a setup of a welding machine, with two pipe sections each having a sleeve, in a first welding step.

Attention is now drawn to FIGS. 5 and 6. The pipe section 12 has a pipe end 40 at a rear end thereof and a peripheral pipe wall 42 having a pipe wall thickness, or "pipe width" PW. A lumen 44 of the pipe section 12 extends axially therethrough and opens out to the pipe end 40. To form the pipe splice 10, each sleeve 14 has to first form a sub-assembly 60 with its associated pipe section 12. The sub-assembly 60 is reached by first axially aligning the sleeve 14 and the pipe section 12 with the lip 20 facing the pipe end 40 (axial alignment of sleeve and pipe section not shown) and then urging the sleeve 14 axially towards the pipe section 12. Prior to attaching each sleeve 14 with its associated pipe section 12, the pipe end 40 of the pipe section 12 may optionally be cut generally perpendicular to the axis A to expose a clean rearwardly facing surface at the pipe end 40 that will smoothly bond when forming the pipe splice 10 as will be described hereinbelow.

It is noted that the pipe section 12, when empty of fluid, may not have at its pipe end 40 a contour similar to a working contour it may have had when carrying fluid under pressure therein. The inner wall 24 of the sleeve 14, on the other hand, is designed to generally maintain a pre-defined contour about the axis A that biases, in the attached position, the pipe end 40 to reach the pre-defined contour. Optionally the pre-defined contour is generally similar to the working contour.

Additionally it is noted that the resilience of the bulges 36 and fingers 38, which is increased by the slits 34, enables the sleeve 14 to adjust and therefore attach to a wide range of pipe sections 12 having each a different working contour and/or pipe width PW. In an embodiment of the disclosure the sleeve 14 may have any number of slits 34 ranging from one and above. In another embodiment of the disclosure the sleeve 14 may not have any slits 34 at all and therefore may attach to a narrower range of pipe sections 12. In such an embodiment, the outer wall 26 may be referred to as the finger 38 and the neck 30 of the inner wall 24 as the bulge 36.

In the attached position, the inner wall 24 of the sleeve 14 is located in the lumen 44 and fits within the pipe wall 42 and the outer wall 26 of the sleeve 14 fits over the pipe wall 42 thereby locating the pipe end 40 within the gap 28. The resilience of each bulge 36 and associated finger 38 ensure that at least a portion of the pipe wall 42 adjacent the pipe end 40 is slightly pressed and snugly fits therebetween. A splice width CW, measured in the vicinity of the pipe end 40 in a direction perpendicular to the axis A, includes the widths of a given bulge 36, its associated finger 38 and the pipe width PW of the portion of the pipe wall 42 that is snugly received therein. A splice center line CL that divides the splice width CW into two equal halves passes through the pipe wall 42 in the vicinity of the pipe end 40. The above mentioned vicinity of the pipe end 40 includes a portion of the pipe wall 42 that melts when forming the pipe splice 10 as will be described hereinbelow.

Figure 8:
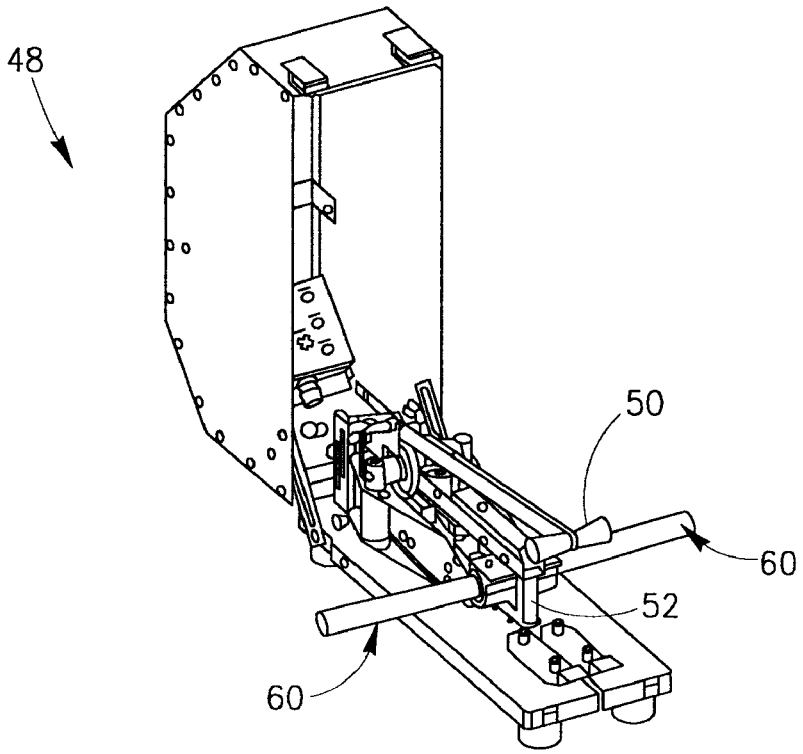
FIG. 8 shows the setup in a second welding step.

Attention is now drawn to FIGS. 7 to 10 to describe several steps in a process of fuse welding together two sub-assemblies 60 to form a pipe splice 10. In the first step, the two sub-assemblies 60, each comprising a pipe section 12 and its attached sleeve 14 are placed in clamps 46 of a splicing machine 48 (FIG. 7) with the two sleeve rims 18 generally facing each other. In the second step, manually moving a handle 50 of the machine 48 urges each sub-assembly 60 to press against a hot plate 52 of the machine 48 at the vicinity of the sleeve's rim 18 and generally axially align with the opposing sub-assembly 60 (FIG. 8).

Figure 11:
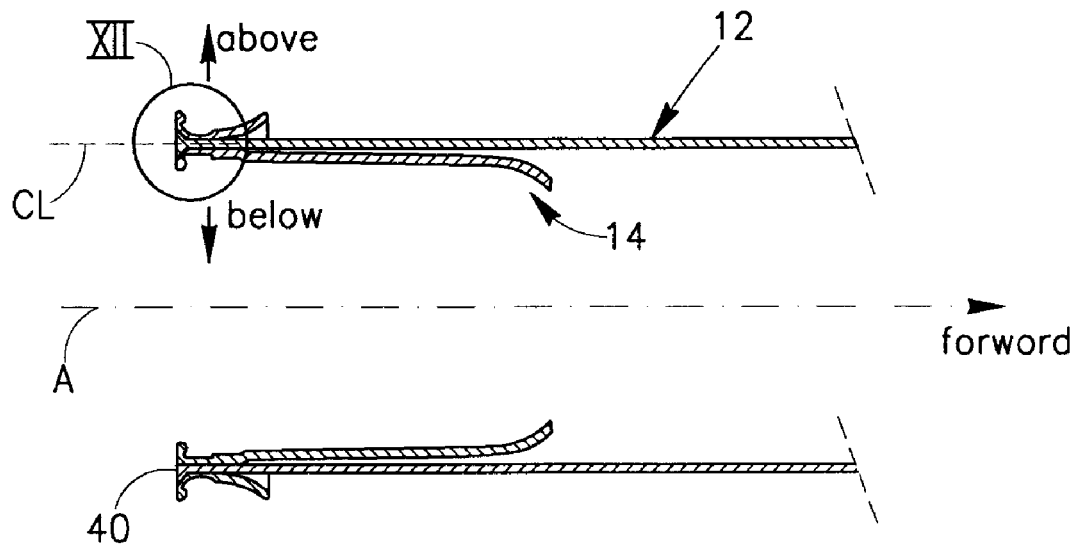
FIG. 11 shows a cross section of one of the pipe sections and its respective sleeve after the second welding step.
Figure 12:
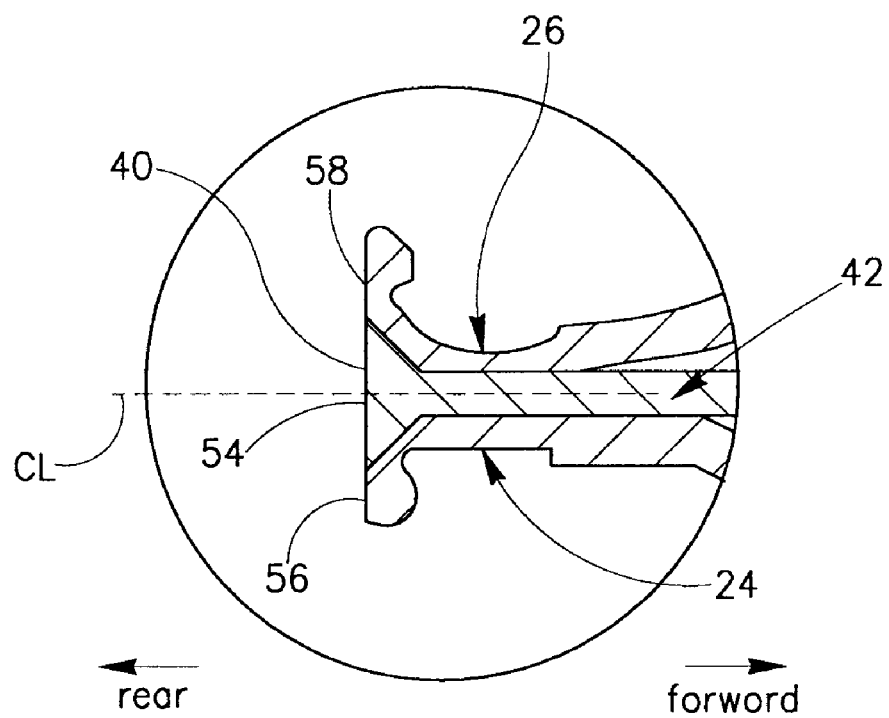
FIG. 12 shows a section of FIG. 11.

Attention is now additionally drawn to FIGS. 11 and 12. During the second step, due to the heat of the plate 52 (not shown in FIGS. 11 and 12) and the biasing force FB thereupon, the melted inner, outer and pipe walls 24, 26, 42 of each pipe section 12 and its attached sleeve 14 flow generally away from the splice center line CL. Portions of the sleeve 14 adjacent the rim 18 located above and below the splice center line CL first melt and flow along the plate 52 in a direction away and towards the axis A, respectively. This exposes also the pipe wall 42 to the plate 52.

A portion of the pipe wall 42 that is located below the splice center line CL and towards the axis A then flows generally towards the axis A along the plate 52 together with the inner wall 24. And, a portion of the pipe wall 42 of each pipe section 12 that is located above the splice center line CL in a direction away from the axis A then flows generally away from the axis A along the plate 52 together with the outer wall 26 of the attached sleeve 14.

Each sub-assembly pipe section 12 therefore has at the end of the second step, a rearwardly facing peripheral pipe segment 54 of the pipe wall 42 which is sandwiched between rearwardly facing peripheral inner and outer segments 56, 58 of respectively the inner and outer walls 24, 26 of the attached sleeve 14.

Figure 9:
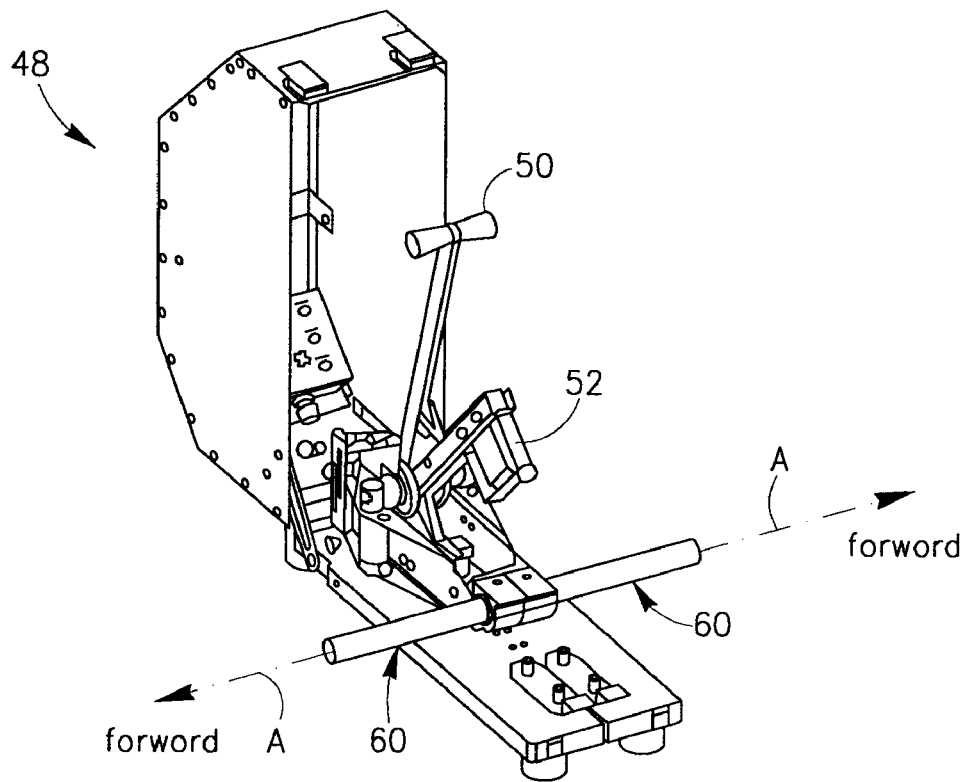
FIG. 9 shows the setup in a third welding step.
Figure 10:
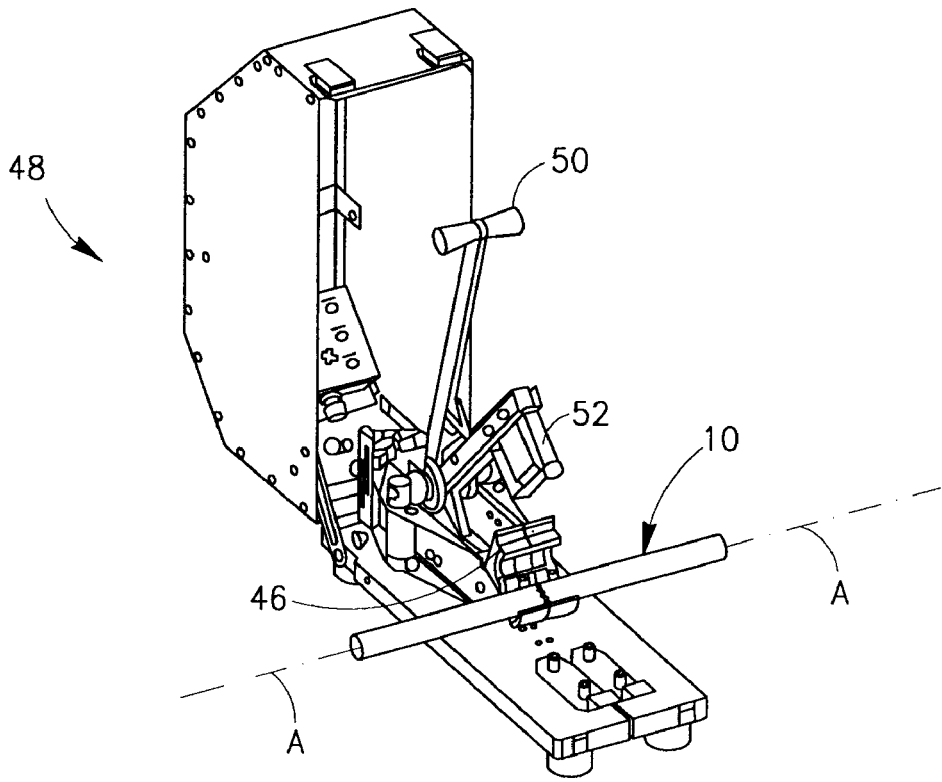
FIG. 10 shows the setup in a fourth welding step.

Attention is now drawn back to FIGS. 9 and 10. In the third step (FIG. 9), manually moving the handle 50 first removes the plate 52 from between the two sub-assemblies 60 thereby exposing the opposing pipe, inner and outer segments 54, 56, 58 to face each other and then urges the two sub-assemblies 60 axially towards each other to form the pipe splice 10.

Figure 13:
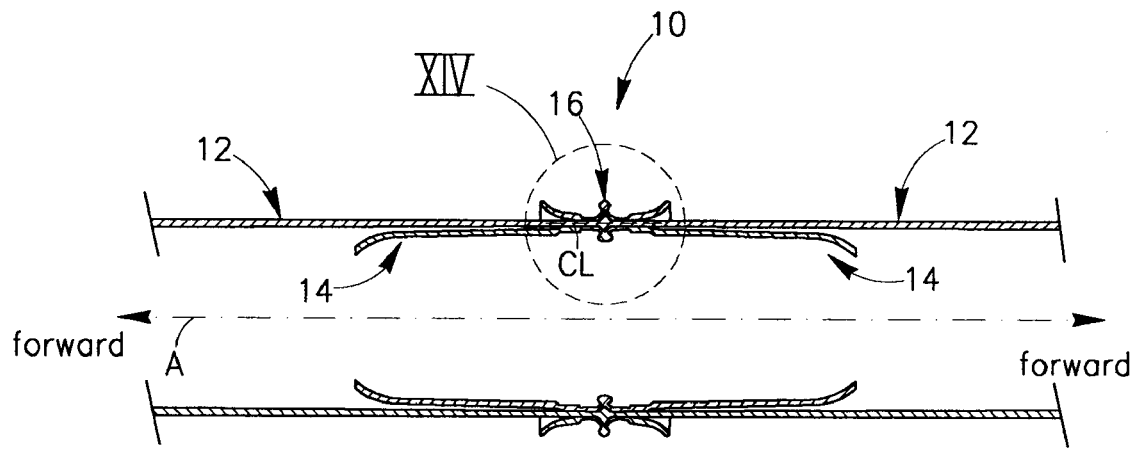
FIG. 13 shows a cross section of the pipe splice shown in FIG. 1.
Figure 14:
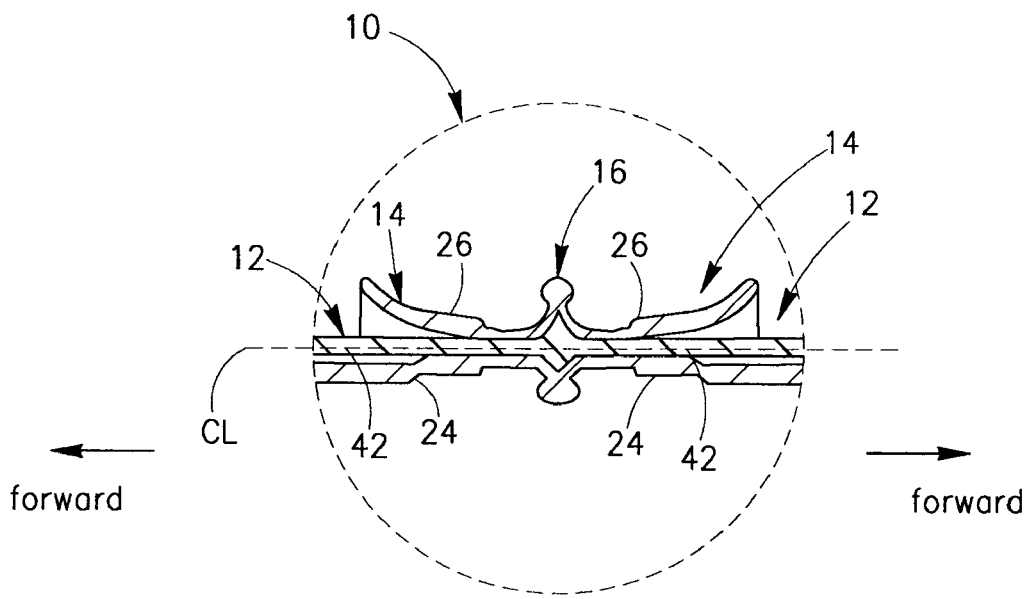
FIG. 14 shows a section of FIG. 13.

Attention is now additionally drawn to FIGS. 13 and 14. Each sub-assembly 60 is biased against the opposing sub-assembly 60 for a period of time sufficient for the opposing pipe segments 54 to at least partially bond to each other, the opposing outer segments 58 to at least partially bond to each other and the opposing inner segments 56 to at least partially bond to each other. In the pipe splice 10, the splice center lines CL of the opposing sub-assemblies 60 generally align and pass through the pipe wall 42 of each sub-assembly 60 in the vicinity of the join 16. The above mentioned vicinity of the join 16 includes the portions of the pipe walls 42 that melted to form the pipe splice 10. In the fourth step (FIG. 10), the clamps 46 open and the pipe splice 10 can be removed from the machine 48.

It is noted that the sleeves 14, by maintaining the pre-defined contour at the pipe end 40, ensure that in the third step each pair of opposing pipe, inner and outer segments 54, 56, 58 is generally axially aligned and therefore will at least partially meet and bond.

In addition it is noted the inner and outer walls 24, 26 of the sleeve 14, form a wide structure with the pipe end 40 which is pressed and urged to flow upon the hot plate 52 by the biasing force FB. This biasing force FB has a larger magnitude and tolerance than a smaller force FS that would be required if the structure being pressed and urged to flow upon the hot plate 52 would only include the pipe end 40. Devices providing the biasing force FB are cheaper than devices providing the smaller force FS and therefore the splicing machine 48 in accordance with the present disclosure is cheaper and due to the larger tolerance is more robust and suitable for use in field conditions.

It is noted, that whereas the pipe sections 12 and sleeves 14 described hereinabove are shown having a circular contour about the axis A, a pipe section 12 and a sleeve 14 in accordance with an embodiment of the disclosure, can be configured to have a contour other than circular about the axis A. For example, a pipe section 12 and a sleeve 14 in accordance with an embodiment of the present disclosure can have an elliptical, rectangular or any other shape or combined shape about the axis A.

Although the present embodiment has been described to a certain degree of particularity, it should be understood that various alterations and modifications could be made without departing from the scope of the disclosure as hereinafter claimed.

What is claimed is:

1. A method of forming an irrigation pipe splice comprising:
    providing two pipe sections and two sleeves, each sleeve comprising an inner wall and an outer wall that meet at a rim, wherein the inner wall is capable of being received in at least a portion of a pipe section and the outer wall is capable of fitting over at least a portion of said pipe section;
    forming two sub-assemblies from the two sleeves and the two pipe sections, each sub-assembly comprising a sleeve mated to an associated pipe section with the sleeve inner wall received into a portion of the pipe section, the sleeve outer wall fitting over an end portion of a pipe wall, and the sleeve rim covering at least a portion of a pipe end of the pipe section;
    axially aligning the two sub-assemblies so that the rims face each other; and
    applying heat to the rims; and
    axially biasing at least one sub-assembly against the other sub-assembly until they meet at a join.

2. The method according to claim 1, wherein applying heat to the rims comprises urging the two sub-assemblies to press against a hot plate in the vicinity of their respective rims.

3. The method according to claim 1, wherein:
    applying heat to the rims and axially biasing one sub-assembly against the other sub-assembly results in a splice width that includes the inner, outer and pipe walls; and
    a splice center line dividing the splice width into two halves, passes through the pipe wall at least adjacent the join.

4. The method according to claim 3, wherein the heat causes at least a portion of the pipe wall above the splice center line to flow above and away from the splice center line and at least a portion of the pipe wall below the splice center line to flow below and away from the splice center line.

5. The method according to claim 1, wherein each sleeve extends along an axis and is designed to maintain a pre-defined contour about its axis so that when mated to a pipe section, the sleeve is adapted to bias the pipe end of the pipe section to reach the pre-defined contour.

6. The method according to claim 5, wherein the pre-defined contours of both sleeves are substantially identical.

7. The method according to claim 1, further comprising:
    providing each sleeve with at least one slit formed in the inner or outer wall.

* * * * *